Sept. 27, 1955  W. G. WING  2,719,291
RATE OF TURN GYROSCOPE
Filed Nov. 21, 1951  2 Sheets-Sheet 1

INVENTOR
WILLIS G. WING
BY
Herbert H. Thompson
his ATTORNEY.

Sept. 27, 1955  W. G. WING  2,719,291
RATE OF TURN GYROSCOPE
Filed Nov. 21, 1951  2 Sheets-Sheet 2
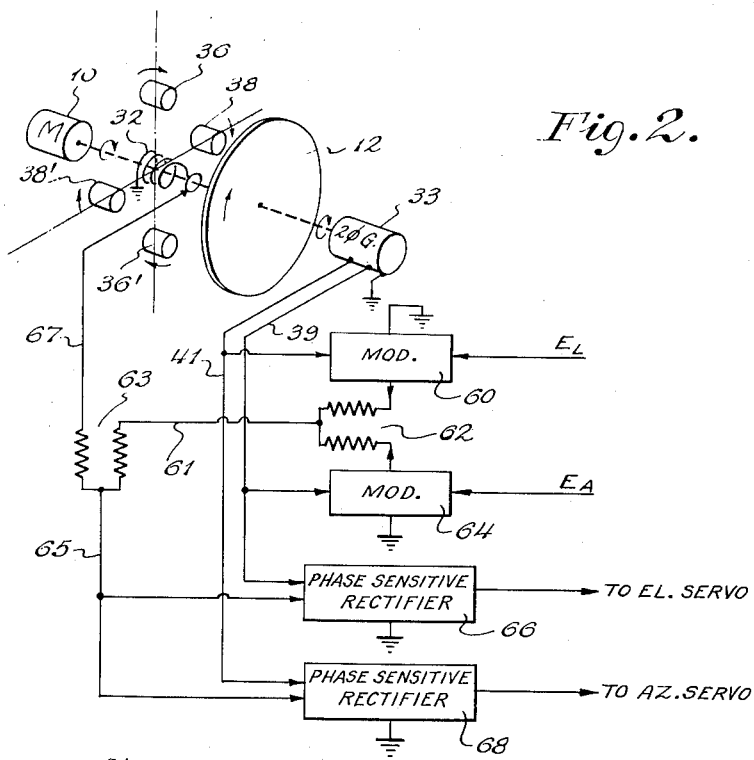
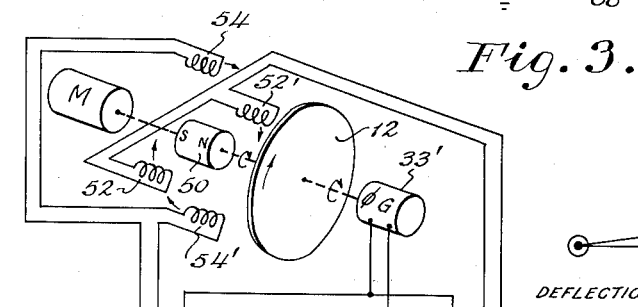
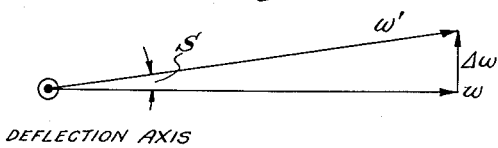
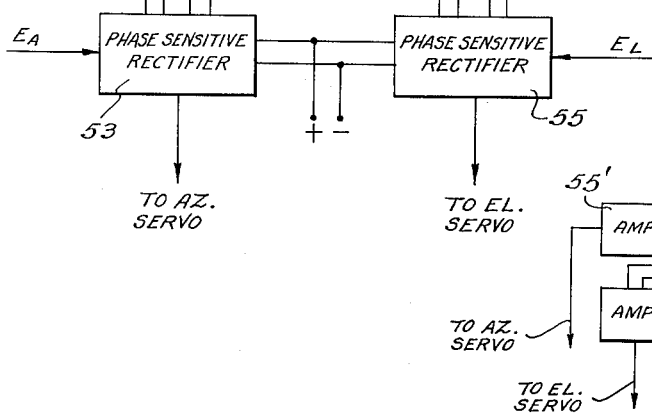
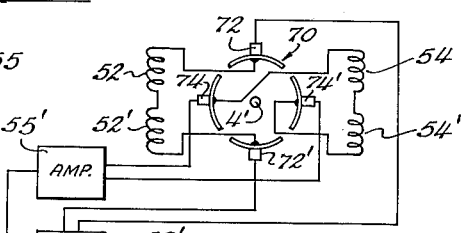
INVENTOR
WILLIS G. WING
BY
Herbert H. Thompson
his ATTORNEY.

United States Patent Office 2,719,291
Patented Sept. 27, 1955

2,719,291
RATE OF TURN GYROSCOPE

Willis G. Wing, Roslyn Heights, N. Y., assignor to Sperry Rand Corporation, a corporation of Delaware Application November 21, 1951, Serial No. 257,474

18 Claims. (Cl. 340—345)

This invention relates to gyroscopes adapted to be used for stabilizing purposes on vehicles or other movable platforms. It may also have application to fire control for the production of a signal proportional to angular rate of movement of the target. In general, two different types of gyroscopes are employed for such purposes, the three-degree of freedom gyroscope (i. e. one having two degrees of freedom besides that of its spin axis) in which the rotor spin axis remains stationary (or is caused to precess at a predetermined rate) and a signal is produced by displacement of the mounting with respect to the gyro, and the rate of turn or two degree of freedom gyroscope which has but one degree of freedom besides its spin axis and is spring centralized, so that the amount of precession angle is a measure of the rate of turn.

While my improved gyro resembles the rate of turn gyroscope, it differs therefrom by having little or no spring centralization and its behavior resembles, to some extent, that of a free gyro in that the gyro has limited freedom about two axes in addition to the spin axis. It is restrained, however, about said two axes by a drag or damping device which rotates with the rotor and acts in lieu of centralizing springs in a manner such that after a steady state rate of turn is reached, the angle S between the plane of rotation of the rotor and its casing represents the rate of turn.

My construction also has the valuable characteristic that when a sudden turn is started, the lag angle S of the spin plane of rotor behind that of its casing due to the inertia of the rotor will also be proportional to the final rate of turn since the rate of increase of the angle S is proportional to the final rate of turn.

With my invention I have accomplished a number of other important advances over prior art gyroscopes. With my rate of turn gyro I am able to detect and measure angular rates about two mutually perpendicular axes and therefore may employ only one such gyro where two rate gyros are now normally employed. Also, with my new construction I have made the securing of accurate rotor balance more certain since I have no bearings or motor windings associated with the assembly requiring good balance. I also reduce or eliminate spurious signals near the zero position of the instrument.

Further objects and advantages of my invention will become apparent from the following description.

Fig. 2 is an elementary wiring diagram illustrating how the invention could be used in stabilizing an object on which it is mounted as well as the production of signals proportional to rate of turn;

Fig. 3 is a similar diagram of a modified form of the invention; and

Fig. 4 is a vector diagram showing the desired characteristics of centralizing force employed on the rotor.

Fig. 5 is a wiring diagram showing a modified form of the invention using a commutator instead of modulators to segregate the sigals about the two axes.

Figure 1:
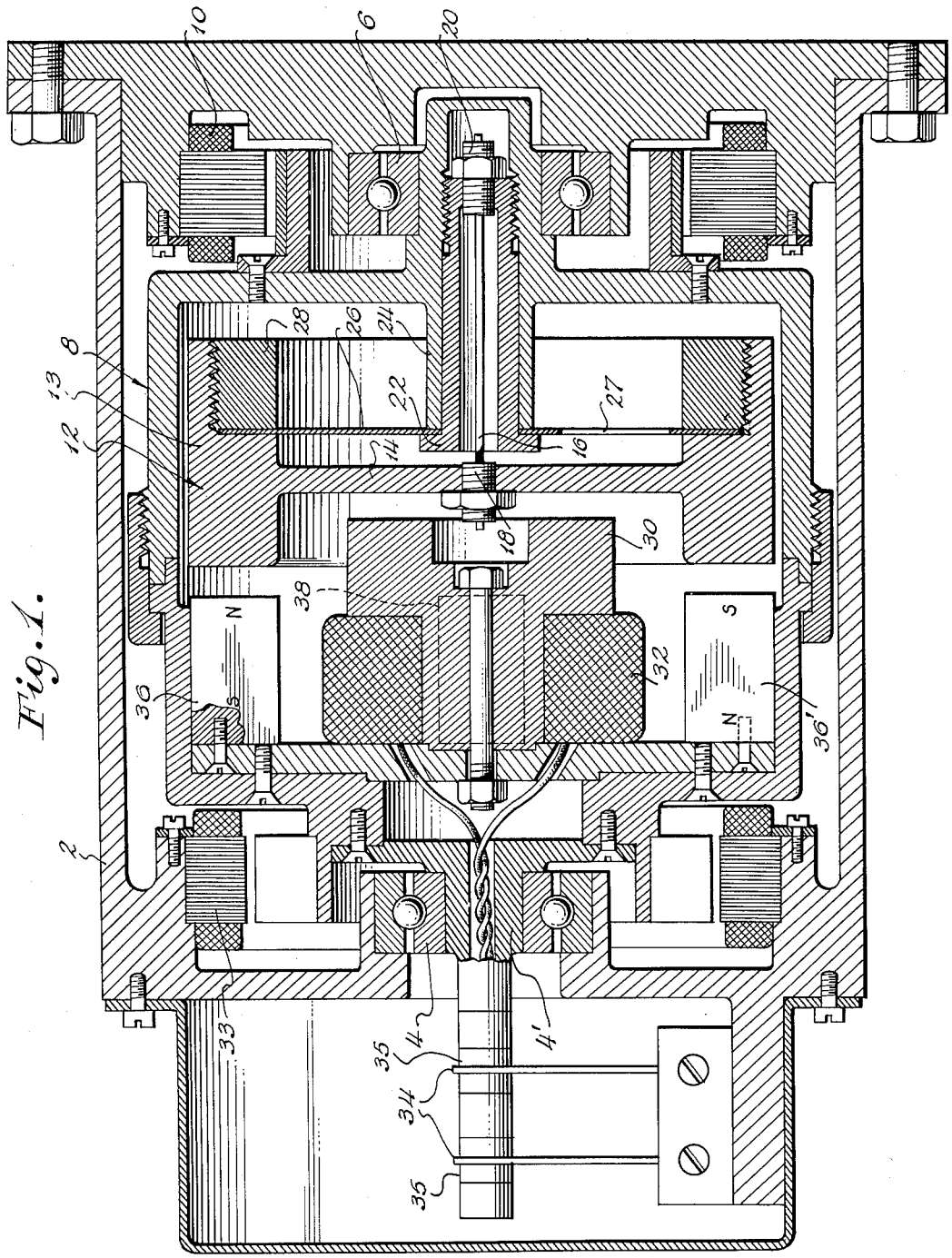
Fig. 1 is a cross section of a gyroscope constructed in accordane with my invention, but on an enlarged scale.

The gyroscope illustrated is shown as having an outer casing 2 within which is mounted anti-friction bearings 4 and 6 journaling for rotation an interior rotor case 8 which may be continuously spun by any suitable form of motor 10. Within case 8, I mount what may be termed the gyro rotor 12, which is shown as having a rim 13 and a web 14 accurately positioned axially by a tension wire 16 clamped at one end in a set screw 18 threaded in said web and at the other end in a set screw 20 secured in a sleeve 22 within the hub 24 of the case 8. Also coupling the rotor 12 and hub 24 is a flexible diaphragm 26 preferably located in the radial plane containing the center of gravity of the rotor and which may be cut out at spaced points 27. It is shown as clamped at its center between the sleeve 22 and hub 24 and its outer end between the rotor rim 13 and ring 28 threaded therein. The rotor is thus spun at the same speed as the case 8, but has a limited degree of freedom with respect thereto about both axes normal to the spin axis. It, therefore, constitutes a true gyro rotor. Due to its flexible mounting, dynamic unbalance troubles are also largely avoided and axial shift is prevented by wire 16.

The outer case 8, however, while it revolves, is otherwise rigidly coupled to its casing 2 by its bearings 4 and 6 so that it is prevented from precessing and partakes immediately of all angular motions of its support 2. Therefore, upon tilting action taking place, the plane of rotation of the rotor and the plane of rotation of the case will differ and it is this phenomenon that is made use of by me to generate signals for stabilization or prediction angles or other purposes.

To detect this tilt and transmit the amount and plane thereof to a distance, I further employ inductive pickups, although obviously pickups of other characteristics, such as capacitative pickups, may be used. In a preferred form, I secure within case 8 a soft iron core 30 having a pickup coil or solenoid 32 thereon, the output of the coil being shown as led without the case by means of slip rings 35 and brushes 34. I also mount within the case symmetrically placed magnets 36, 36' and 38, 38' preferably in the form of two 90° spaced pairs of permanent magnets, the individual members of each pair being at 180 degrees from one another and having oppositely facing poles. Since the rotor is preferably also made of iron, it will be seen that dual paths for the magnetic flux lead from each pole through the rotor web 14 and core 30 and that normally the flux from each pole tending to thread the core is opposed by the flux from the opposite pole so that no flux threads core 30. It will also be seen that the width of the gap between the rim face of the rotor and each magnet, and therefore the reluctance in the magnetic circuit, will be varied upon relative tilt of the rotor and case, being decreased during one-half of each revolution and increased in the other half. Pulsating flux will, therefore, pass through core 30 in proportion to the relative tilt. The plane of this tilt will remain substantially constant as long as the rate of turn producing the tilt about the same axis continues, and an alternating current signal will be generated (in a manner hereinafter explained) in winding 32 having a frequency equal to the speed of rotation of the ensemble, a magnitude or amplitude proportional to the relative tilt about the same axis and a phase sense which depends upon the sense of the rate of turn with respect to the axis.

A two phase A. C. generator 33 is provided having its stator fixed to the support 2 (as shown) and its rotor fixed to the container 8 (as shown) to be driven at the same speed as the gyroscope rotor. The generator produces two A. C. reference voltages of the same frequency as the voltages generated in the winding 32, the two reference voltages being 90° phase displaced with respect to each other. The phases of the output voltages from the winding 32 may be compared with those of the reference voltages in well known manner and two component signal voltages derived which are measures in magnitude and sense of the component relative tilts of the gyroscope rotor about two mutually perpendicular axes and which are thus measures of the component rates of turn of the support about these axes. The generator 33 thus serves in effect to define two mutually perpendicular axes about which rates of turn may be measured.

If the spring properties of the diaphragm 26 were depended upon to act as a spring centralizer for the gyro, the device would be operative as a rate of turn gyro, but I prefer not to employ such properties for this purpose, for the reason that while the final steady state position of the gyro during a continuous turn would correctly indicate the rate of turn, there would be initially created an erroneous signal due to the gyroscopic inertia of the rotor, which would tend to remain fixed in space upon initial signal would be created at 90 degrees phase displacement to the final signal, when the motion causing both such signals was about only one axis. Instead, therefore, of employing a spring centralizer, I prefer to employ a coercive force which produces a precession in the same plane as the initial tilt of the casing with respect to the rotor, so that only one signal about one axis is produced upon tilt of the case about one axis.

I have discovered and proved both mathematically and experimentally that a unique torque having certain properties of both a damping and non-resilient centralizing torque will satisfy this requirement. In the diagram of Fig. 4 the vector $\omega$ represents the angular velocity of the rotor and $\omega^1$ the angular velocity of the rotating case during a turn. Since these velocities are equal, and the vectors lie in different directions at an angle S, the resultant velocity vector is $\Delta\omega$ and if S is small $\Delta\omega$ is equal to $\omega S$. From the diagram, it is apparent that $\omega$ lies in a plane containing the spin axis of the gyro wheel but which is at right angles to the axis of the tilt between the wheel and the rotating case. From the generally known principles of gyro precession, it is evident that a torque applied about the axis of $\Delta\omega$ but oppositely directed will cause precession of the gyro wheel about the axis of tilt and in a direction to reduce the tilt angle, S, to zero. Introducing a damping action between the gyro rotor and the rotating case will result in application of a torque ($L_d$) to the gyro rotor about the axis of any relative angular velocity, proportional to the relative angular velocity and oppositely directed. It will be noted that this exactly specifies the torque discussed above which would be required to precess the gyro rotor into alignment with the case. Assuming a damping coefficient $\beta$ then $L_d = \beta\Delta\omega = \beta\omega S$. The precession torque $L_p$ for a rate of turn $$\frac{d\theta}{dt}$$

is $$L_p = J\omega\frac{d\theta}{dt}$$

where J is the polar moment of inertia of the wheel and $$\frac{d\theta}{dt}$$

is in radians per second. In a steady state these two torques are equal; therefore $$\beta\omega S = J\omega\frac{d\theta}{dt}$$

which may be written $$S = \left(\frac{J}{\beta}\right)\frac{d\theta}{dt}$$

To provide the damping torque, I prefer to fill the case 8 with a viscous fluid such as silicon, which therefore furnishes an additional coupling between the case and the rotor 12 and which strongly both opposes and damps any relative tilt between the two. By making the diaphragm 26 of thin sheet metal, having little elasticity, the spring centralizing action of this disc or diaphragm may be made so small as compared to the action of the viscous liquid as to be negligible. In addition, it will be noted that the four magnets 36, 36', 38, 38' will exert a decentralizing action on the rotor, since upon relative tilt, the magnet nearest the rotor will increase its pull on the rotor and the reverse will be true for the opposite magnet. This action, therefore, may be made to cancel the centralizing action of the disc or diaphragm 26.

A valuable feature of my invention is that the lag angle S, between the gyro rotor and its case develops exponentially upon the sudden application of a turn rate. The nature of this response requires that the initial rate of change of this lag angle be equal to the rate of turn and this occurs as a result of the tendency of the gyro rotor to remain fixed in space while the case moves at the said rate. The time constant of this exponential may be shown to be $$\frac{J}{\beta}$$

and in the steady state as has been pointed out $$S = \left(\frac{J}{\beta}\right)\frac{d\theta}{dt}$$

The invention produces a correct signal proportional to a steady rate of turn with a time lag equal to $$\frac{J}{\beta}$$

From a consideration of dynamics this response is to be preferred to the oscillatory response of the conventional rate gyro, my invention producing a signal proportional to the final rate of turn achieved by the time a steady rate of turn is reached. Therefore, my invention produces a correct signal proportional to rate of turn by the time a steady state rate of turn is arrived at.

The simplified wiring diagram of Fig. 2 shows how the signal produced may be used to stabilize an object such as a gun sight or radar antenna about both axes of stabilization at the same time permitting independent orientation of the object. When used in a radar or gun sight, the system would resemble the gyro stabilized predicting system of the copending application of Holschuh, Hammond and White, Serial No. 444,152, filed May 22, 1942, for Stabilized Tracking and Fire Control System, now Patent No. 2,660,793, or my invention could be employed in lead angle computers as the two rate gyros are employed in the copending application of Draper and Bentley, Serial No. 440,660, filed April 27, 1942, for Gunsight Having Lead Computing Device, now Patent No. 2,609,606, my device, however, requiring only one gyro.

To separate that portion of the signal voltage generated in winding 38 by induction from one pair of poles 36, 36' from the 90 degree phase signal generated by the other pair of poles 38, 38', I compare the phases of said two components of the signal generated in said winding 38 to the two 90 degree displaced phases of the two phase generator 33, which represent elevation and azimuth or elevation and roll depending on how the rate gyro is mounted thereon. One method of accomplishing this purpose is illustrated in the diagram in which one phase lead 39 from generator 33 is fed into modulator 60 into which is also fed the D. C. elevation error signal $E_L$ (for instance) from the control instrument (not shown) and the A. C. output is fed into one side of the summing differential or bridge 62. The other phase lead 41 is fed into a similar modulator 64 into which the azimuth error signal ($E_A$) for instance, of the control instrument about the other axis is fed and the modulated output fed into the other side of the electrical differential 62. The combined output is then fed through lead 61 into a second electrical differential 63 into the other leg of which is fed through lead 67 the A. C. output of the winding 32, so that a single output is secured representing the rate error signal about both axes. This output is then divided or unscrambled again by leading the output wire 65 into phase sensitive amplifier 66 where the output is compared with the elevation phase in lead 39 from the generator 33 and is preferably rectified to produce the output for controlling the elevation servomotor (not shown) of the stabilized instrument. Said output lead 65 is also led to a second phase sensitive amplifier and rectifier 68 where the phase is compared with the azimuth phase (in lead 41) of the two phase generator to produce a direct current output to operate the azimuth servomotor of the instrument. In this manner, the instrument not only follows the movements of the control instrument, and applies prediction angles, but the effects of rolling and pitching of the ship or other vehicle on which it is mounted are eliminated.

In the modification shown in Fig. 3 but one magnet 50 is used, which is positioned centrally in the case 8 and the peripheral permanent magnets of the previous form are replaced by pickup solenoids 52, 52', 54, 54', the coils being oppositely connected so that a zero signal is produced when no tilt is present. This system has the advantage that the signals are produced by separate windings so that the generator 33' may be single phase, while in the form shown in Fig. 1 it should be two phase so as to produce phase currents at 90 degrees to one another. The output of windings 54, 54' and 52, 52' are fed respectively into phase sensitive rectifiers 53, 55 of known types and there compared with the phase of the reference alternating current generated by the generator 33' to produce a D. C. output varying in magnitude with the signal amplitude and in polarity with whether the phase of the signal is in phase with or 180 degrees out of phase with the reference voltages of generator 33'. Both forms also are well adapted for correctly producing two direct current signal outputs for azimuth and elevation or for roll and elevation, by commutating the A. C. signals by commutators mounted on one of the hubs 4' of case 8, by which the use of phase sensitive rectifiers and generator 33' or 33 may be avoided.

Fig. 5 shows a commutator form of the invention as it would appear if applied to the form of pickup shown in Fig. 3. A four-sector, four-brush commutator 70 is mounted on a hub 4' of case 8 in place of the generator 33' and the pair of coils 52, 52' are connected to the opposite segments of one pair of segments 71, 71', while the output of the coils 54, 54' is connected to the other pair of segments 73, 73'. One pair of brushes 72, 72' is connected to the amplifier 53' for the elevation servo and the other pair 74, 74' to the amplifier 55' for the azimuth servo. It will be understood that if a commutator were used in the form shown in Fig. 2, it would likewise have two pairs of brushes, but need only have two segments to which the output of the coil 32 would be connected.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro comprising a support, a pair of adjacent rotors rotatably mounted on said support for normally spinning about the same spin axis, one of said rotors being more rigidly constrained to turn with the support about a second axis than the other, means for spinning said rotors at the same speed, and electromagnetic pick-off means for generating a signal as said rotors revolve together upon such turning of said support causing relative tilt of said rotors, due to variation in the reluctance between said rotors from point to point as they revolve.

2. A gyroscope as claimed in claim 1, wherein said pick-off means comprises a plurality of magnets symmetrically mounted within said case adjacent a face of said rotor, and a central solenoid at the spin axis of said case, whereby an alternating current is induced in said solenoid upon variation in the plane of rotation of said case and rotor.

3. A gyroscope as claimed in claim 2, in which said magnets are arranged in two pairs of oppositely positioned magnets, the pairs being at 90 degrees to one another.

4. A gyroscope as claimed in claim 1, wherein said pick-off means comprises a central magnet on said case adjacent said rotor and a plurality of peripheral pickup coils on said case adjacent a radial face of said rotor whereby alternating current is generated in said coils upon change in the relative planes of rotation of said case and rotor.

5. A gyroscope as claimed in claim 1, wherein said pick-off means includes means for producing magnetic fields across the gap between said rotors at spaced points around the rotors, and at least one pickup winding in which alternating current is induced upon variations in the reluctance in such magnetic paths as the rotors revolve.

6. A gyroscope as claimed in claim 5 also having an alternating current generator driven at the same speed as said rotors, and means for comparing such current to the current induced in said winding or windings to produce an A. C. signal varying in magnitude with the amount of variation in the reluctance path and in phase with the comparative phases of the two currents.

7. A gyroscope as claimed in claim 6 having a phase sensitive rectifier connected to said signal whereby a direct current output is obtained of a magnitude proportional to the amount of relative tilt of said rotors and of a sign varying with the direction of such relative tilt.

8. A gyroscope as claimed in claim 6 also having a commutator driven at the same speed as said rotors and means for passing the output of said winding or windings through said commutator to produce rectified direct current of a magnitude proportional to the relative tilt of said rotors and of sign varying with the direction of such relative tilt.

9. A gyroscope comprising a support, a pair of rotors rotatably mounted on said support for normally spinning about the same spin axis, one of said rotors being more rigidly constrained to orient with the support about a second axis than the other, means for spinning said rotors at the same speed, one of said rotors comprising a case journaled in said support and the other a rotor mounted within said case and flexibly coupled thereto, means for anchoring said rotor against axial displacement within the case, and a viscous fluid within said case and in contact with said rotor and adapted to cause said rotor to follow angular motions of said case about axes other than said spin axis with a lag angle proportional to the speed of such angular motion.

10. A gyroscope as claimed in claim 9 also having pick-off means within the case responsive to relative change of the plane of rotation of one of said case or rotor with respect to the other.

11. A rate of turn gyroscope adapted to measure turn rates about two axes, comprising a support, a case journaled thereon for spinning about an axis normal to said other axes, a rotor within said case and spun thereby normally about said spin axis and a liquid in said case between said case and rotor acting as a viscous sheer coupling between said case and rotor of the drag type to yieldingly oppose relative tilt thereof, whereby the rotor is constrained to follow the turning of said case about both of said two axes at a lag angle proportional to the rate of turn.

12. A rate of turn gyroscope adapted to measure turn rates about two axes, comprising a support, a case journaled thereon for spinning about an axis normal to said other axes, a rotor within said case and spun thereby normally about said spin axis, a viscous sheer coupling between said case and rotor of the drag type, whereby the rotor is constrained to follow the turning of said case about both of said two axes at a lag angle proportional to the rate of turn, and pickup means for generating distinguishable signals upon relative tilt of said case and rotor about each of said first-mentioned axes.

13. A rate of turn gyroscope adapted to measure turn rates about two axes, comprising a support, a case journaled thereon for spinning about an axis normal to said other axes, a rotor within said case, flexible means coupling said rotor and case to rotate the rotor but permitting relative tilt, and a liquid filling said case around said rotor causing said rotor to follow the turning of said case about each of said two axes by viscous sheer at a lag angle proportional to the rate of turn.

14. A rate of turn gyroscope adapted to measure turn rates about two axes, comprising a support, a case journaled thereon for spinning about an axis normal to said other axes, a rotor within said case, axially yielding but rotationally rigid means coupling said rotor and case to rotate the rotor but permitting relative tilt, a liquid filling said case around said rotor causing said rotor to follow the turning of said case about each of said two axes at a lag angle proportional to the rate of turn, and magnetic pick-off means for producing rate of turn signals and also exerting a decentralizing torque between said case and rotor tending to reduce the centralizing effect of said resilient means.

15. A rate of turn gyroscope adapted to measure turn rates about two axes, comprising a support, a case journaled thereon for spinning about an axis normal to said other axes, a rotor within said case and spun thereby normally about said spin axis and a yielding but inelastic coupling between said case and rotor adapted to cause precession of the rotor about the axis of turn at a lag angle proportional to the rate of turn and substantially equal to the initial lag of the rotor behind the case upon initiation of the turn.

16. A rate of turn gyroscope adapted to measure turn rates about two axes, comprising a support, a case journaled thereon for rotation about an axis normal to said other axes, a rotor within said case, spinning means for said case, a diaphragm connecting said case and rotor to synchronously spin one from the other about said spin axis but permitting relative tilt thereof and a yielding but inelastic coupling between said case and rotor adapted to cause precession of the rotor about the axis of turn at a lag angle proportional to the rate of turn and substantially equal to the initial lag of the rotor behind the case upon initiation of the turn.

17. A rate of turn gyroscope adapted to measure turn rates about two axes, comprising a support, a case journaled thereon for spinning about an axis normal to said other axes, a rotor within said case, flexible means coupling said rotor and case to rotate the rotor but permitting relative tilt, a liquid filling said case around said rotor causing said rotor to follow turning of said case about each of said two axes at a lag angle proportional to the rate of turn, and an electromagnetic means for generating distinctive signals as said rotors revolve together upon relative tilt about one or the other of said axes thereof due to variation in the reluctance between said rotors from point to point as they revolve.

18. A rate of turn gyroscope adapted to measure turn rates about two axes, comprising a support, a case journaled thereon for spinning about an axis normal to said other axes, a rotor within said case and rigidly coupled thereto rotationally so as to be synchronously spun thereby normally about said spin axis, an additional non-rigid coupling between said case and rotor of the drag type to resist relative tilt between the spin axes of said case and rotor, whereby the rotor is constrained to follow the turning of said case about both of said two axes at a lag angle proportional to the rate of turn, and electromagnetic means for generating distinctive signals proportional to the relative tilt of said rotors about each of said axes.

References Cited in the file of this patent

UNITED STATES PATENTS

| | | |
|---|---|---|
| 1,495,769 | Brewerton | May 27, 1924 |
| 1,890,831 | Smith | Dec. 13, 1932 |
| 2,365,565 | Langer | Dec. 19, 1944 |
| 2,564,854 | Muffly | Aug. 21, 1951 |
| 2,592,417 | Hale | Apr. 8, 1952 |

FOREIGN PATENTS

| | | |
|---|---|---|
| 141,139 | Great Britain | Apr. 11, 1920 |